(12) United States Patent
Jung

(10) Patent No.: US 12,252,170 B2
(45) Date of Patent: Mar. 18, 2025

(54) STEERING COLUMN APPARATUS

(71) Applicant: HYUNDAI MOBIS CO., LTD., Seoul (KR)

(72) Inventor: Duck Moo Jung, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/615,532

(22) Filed: Mar. 25, 2024

(65) Prior Publication Data

US 2024/0367708 A1   Nov. 7, 2024

(30) Foreign Application Priority Data

May 2, 2023   (KR) .................. 10-2023-0057101

(51) Int. Cl.
*B62D 1/19*   (2006.01)

(52) U.S. Cl.
CPC .................................. *B62D 1/195* (2013.01)

(58) Field of Classification Search
CPC ........ B62D 1/195; B62D 1/197; B62D 1/185; B62D 1/19; B62D 1/20
USPC ................................... 74/492, 493
See application file for complete search history.

(56) References Cited

U.S. PATENT DOCUMENTS

| | | | | |
|---|---|---|---|---|
| 5,226,853 A | * | 7/1993 | Courgeon | F16C 3/03 280/775 |
| 5,476,284 A | * | 12/1995 | DuRocher | B62D 1/192 188/371 |
| 5,722,300 A | * | 3/1998 | Burkhard | F16D 3/06 384/42 |
| 5,758,545 A | * | 6/1998 | Fevre | F16C 29/002 384/42 |
| 8,549,953 B2 | * | 10/2013 | Schnitzer | B62D 1/185 280/775 |
| 10,814,902 B2 | * | 10/2020 | Wojtalik | B62D 1/192 |
| 11,104,369 B2 | * | 8/2021 | Wojtalik | F16C 27/063 |
| 11,434,954 B2 | * | 9/2022 | Huber | F16C 17/02 |
| 2002/0142850 A1 | * | 10/2002 | Garcia | F16D 3/68 464/180 |
| 2022/0177023 A1 | * | 6/2022 | Büker | F16C 3/03 |

FOREIGN PATENT DOCUMENTS

KR   10-2021-0059982 A   5/2021

* cited by examiner

*Primary Examiner* — Toan C To
(74) *Attorney, Agent, or Firm* — Morgan, Lewis & Bockius LLP

(57) ABSTRACT

Proposed is a steering column apparatus including a housing having a hollow shape, an input shaft rotatably mounted in the housing, and a lower bushing interposed between the housing and the input shaft, the lower bushing being elastically deformable when coming into contact with the housing.

12 Claims, 7 Drawing Sheets

STEERING COLUMN APPARATUS

CROSS-REFERENCE TO RELATED APPLICATION

This application claims the benefit under 35 U.S.C. § 119(a) of priority to Korean Patent Application No. 10-2023-0057101, filed on May 2, 2023 in the Korean Intellectual Property Office, the entire disclosure of which is incorporated herein by reference for all purposes.

BACKGROUND

Field

Exemplary embodiments of the present disclosure relate to a steering column apparatus and, more particularly, to a steering column apparatus capable of preventing shaking in a radial direction of an input shaft.

Discussion of the Related Art

A steering column for column type motor drive power steering (C-MDPS) performs a function of suppressing a motion in a radial direction of a sensor shaft and transferring rotational torque by installing a ball bearing, corresponding in size to a sensor shaft axial system, in a lower end portion of a column, in order to support the sensor shaft axial system when assembling to the C-MDPS.

The ball bearing, which is very expensive, has low price competitiveness when compared against its primary function of supporting a motion in a radial direction and its secondary function of transferring rotational force. Therefore, there is a need to alleviate this problem.

The related art of the present disclosure is disclosed in Korean Patent Application Publication No. 10-2021-0059982 (published on May 26, 2021 and entitled "MOTOR-DRIVEN STEERING COLUMN APPARATUS."

SUMMARY

Various embodiments, which are devised to address the above-mentioned problem, are directed to a steering column apparatus capable of preventing shaking in a radial direction of an input shaft.

In an embodiment, a steering column apparatus includes: a housing having a hollow shape: an input shaft rotatably mounted in the housing; and a lower bushing interposed between the housing and the input shaft, the lower bushing being elastically deformable when coming into contact with the housing.

The lower bushing may include: a lower bushing outer portion; and a lower bushing inner portion connected to the lower bushing outer portion and arranged inside the lower bushing outer portion.

The lower bushing may be formed in a shape of a ring.

The lower bushing may include a connection reinforcement portion connecting the lower bushing outer portion and the lower bushing inner portion to each other.

The lower bushing inner portion may be formed in a shape of a ring, and the lower bushing inner portion may include: a first lower bushing inner portion surrounding the input shaft; a second lower bushing inner portion formed to have a smaller diameter than the first lower bushing inner portion; and a lower bushing connection portion connecting the first lower bushing inner portion and the second lower bushing inner portion to each other.

The lower bushing connection portion may be formed in such a manner that the first lower bushing inner portion is inclined by a setting angle toward the second lower bushing inner portion.

A plurality of the connection reinforcement portions may be formed along respective circumferential directions of the lower bushing outer portion and the lower bushing inner portion.

The plurality of the connection reinforcement portions may be arranged to be spaced equal distances apart from each other along the respective circumferential directions of the lower bushing outer portion and the lower bushing inner portion.

The lower bushing may further include a protrusion formed to protrude toward the housing from an inner surface of the lower bushing outer portion, the protrusion being elastically deformable when coming into contact with the housing.

A plurality of the protrusions may be formed to be spaced equal distances apart from each other along a circumferential direction of the lower bushing outer portion.

The lower bushing may be formed of plastic material.

The input shaft may include an input shaft body rotatably mounted in the housing; an input shaft protrusion mounted on an end portion of the input shaft body and coming into contact with the lower bushing; and an O-ring formed of elastically deformable material, the O-ring being mounted on an outer surface of the input shaft protrusion.

In the steering column apparatus according to the present disclosure, the elastically deformable lower bushing interposed between the housing and the input shaft can support the motion in the radial direction of the input shaft.

According to the present disclosure, the elastically deformable lower bushing interposed between the housing and the input shaft can substitute for a ball bearing in the related art, thereby reducing the unit cost of production.

According to the present disclosure, the lower bushing formed of plastic material can reduce the manufacturing time and the weight of a vehicle.

DETAILED DESCRIPTION OF THE ILLUSTRATED EMBODIMENTS

Figure 1:
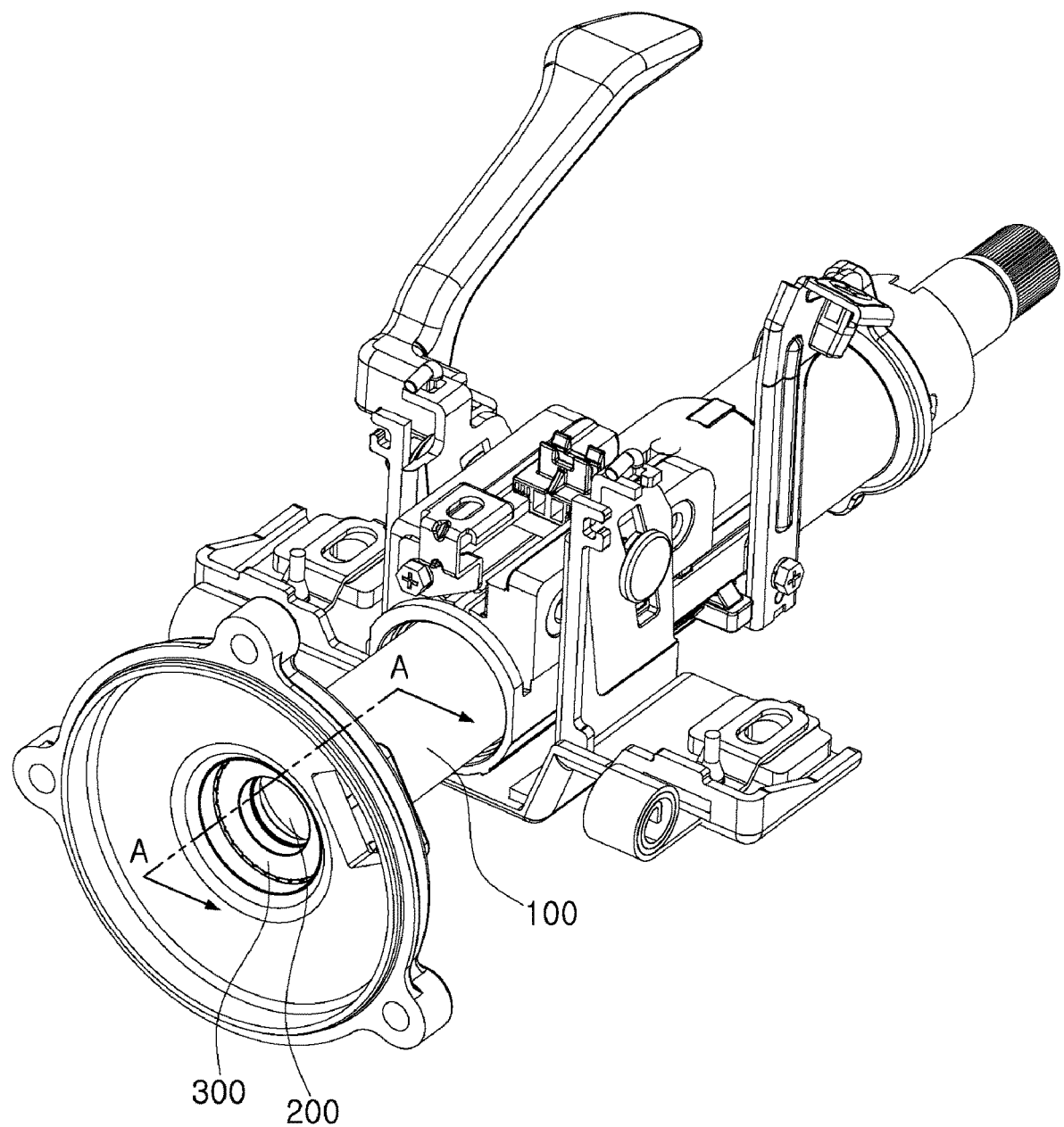
FIG. 1 is a perspective view schematically illustrating a steering column apparatus according to an embodiment of the present disclosure.

A steering column apparatus according to an embodiment of the present disclosure will be described below with reference to the accompanying drawings. For clarity and convenience in description, thicknesses of lines, sizes of constituent elements, and the like may be illustrated in a non-exact proportion in the drawings.

In addition, terms defined by considering the meanings thereof in the present disclosure will be used below and may vary according to the user's or manager's intention or to practices in the art. Therefore, these terms should be contextually defined in light of the present specification.

Figure 2:
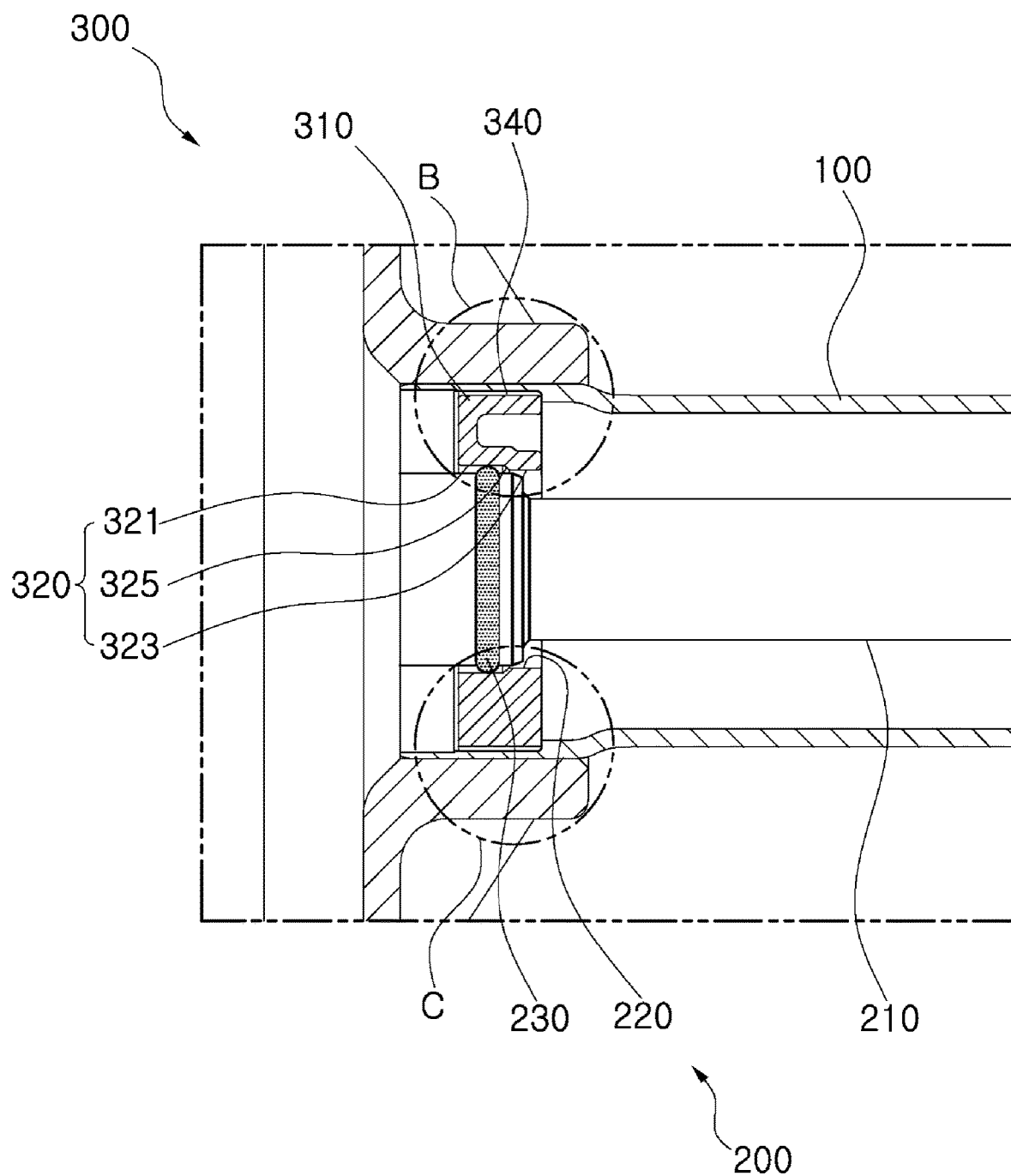
FIG. 2 is a schematic cross-sectional view taken along line A-A on FIG. 1.
Figure 3:
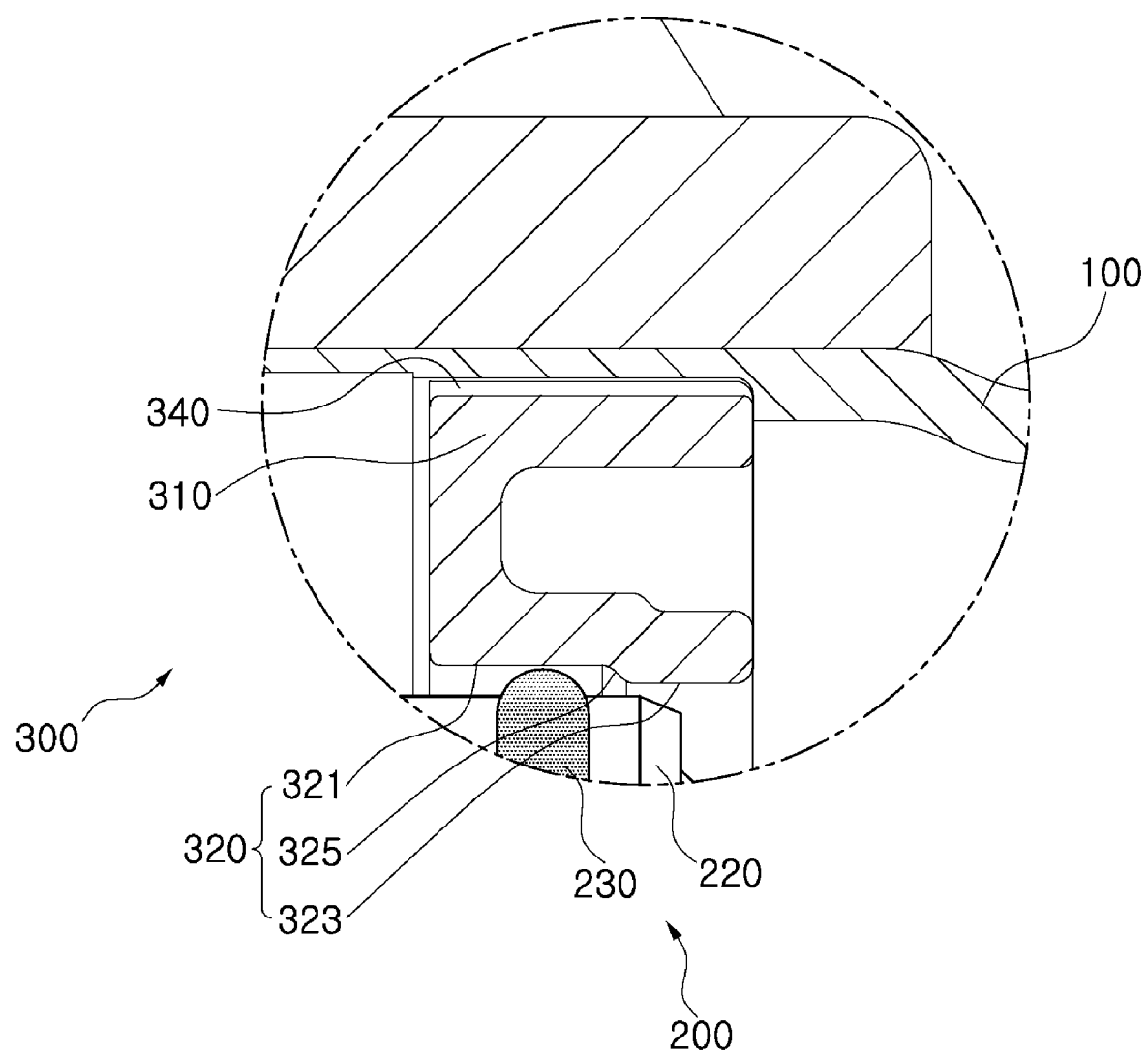
FIG. 3 is a partially enlarged cross-sectional view schematically illustrating the circular portion "B" indicated by a dash-double dotted line on FIG. 2.
Figure 4:
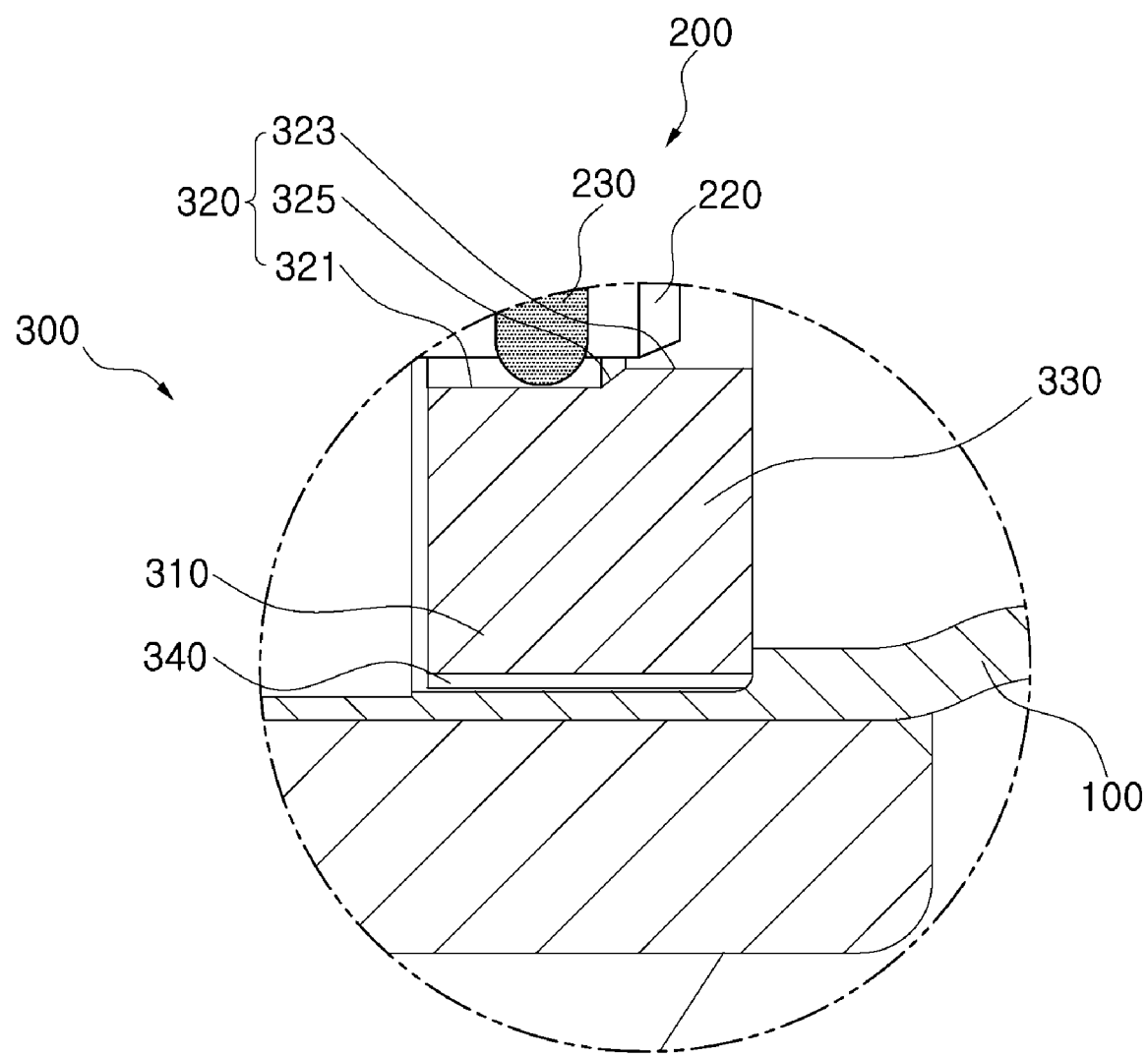
FIG. 4 is a partially enlarged cross-sectional view schematically illustrating the circular portion "C" indicated by a dash-double dotted line on FIG. 2.
Figure 5:
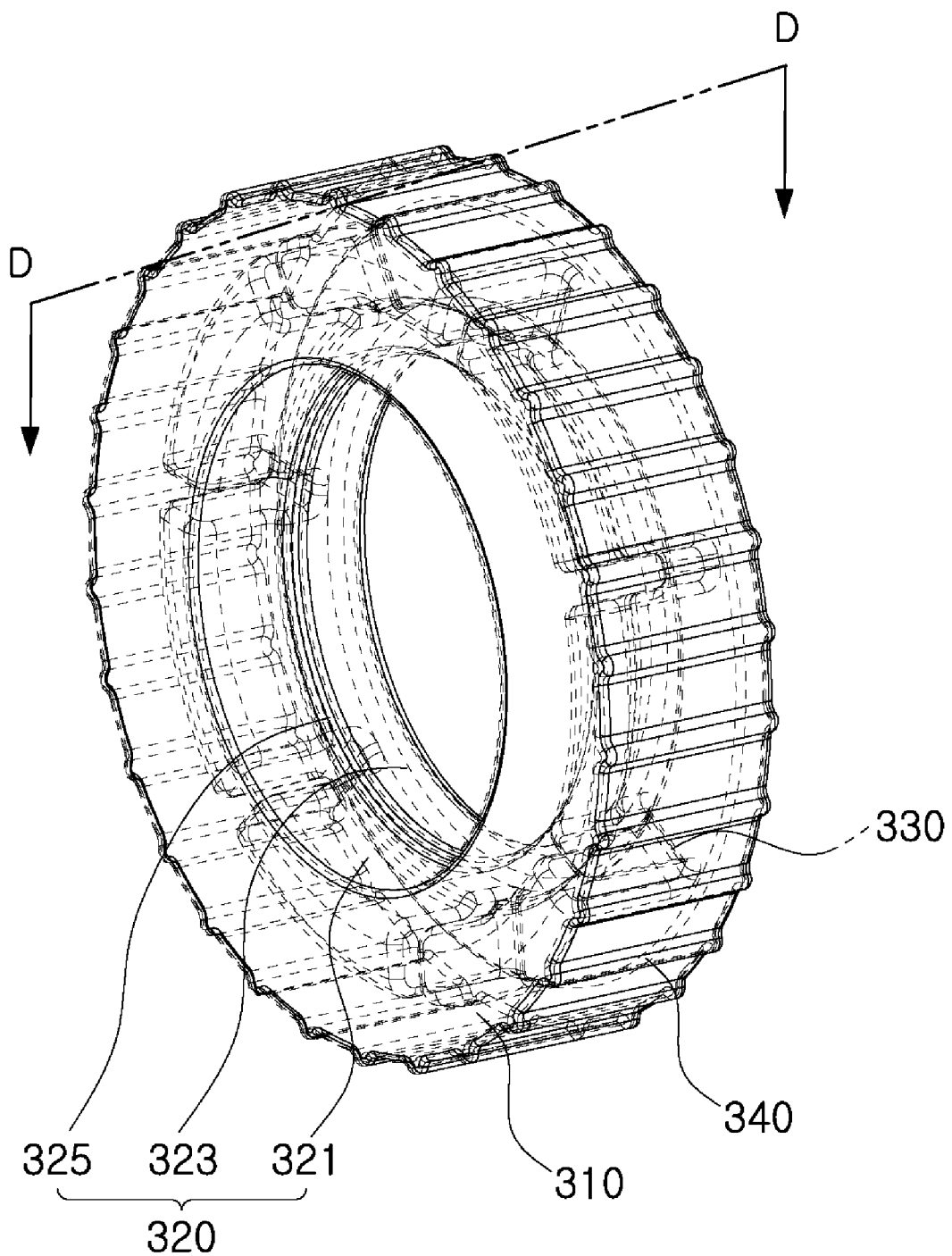
FIG. 5 is a perspective view schematically illustrating a lower bushing according to the embodiment of the present disclosure.
Figure 6:
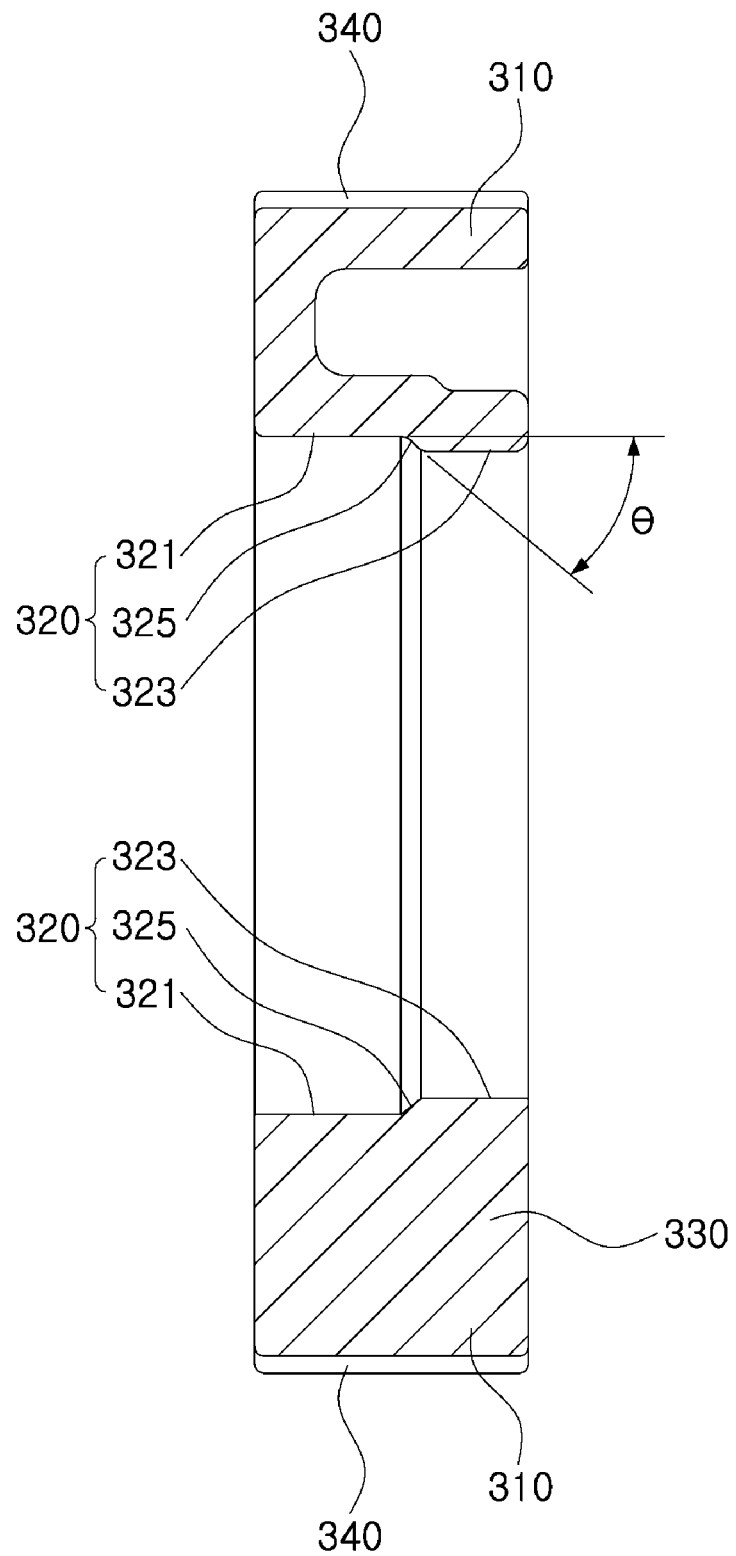
FIG. 6 is a schematic cross-sectional view taken along a line D-D on FIG. 5.
Figure 7:
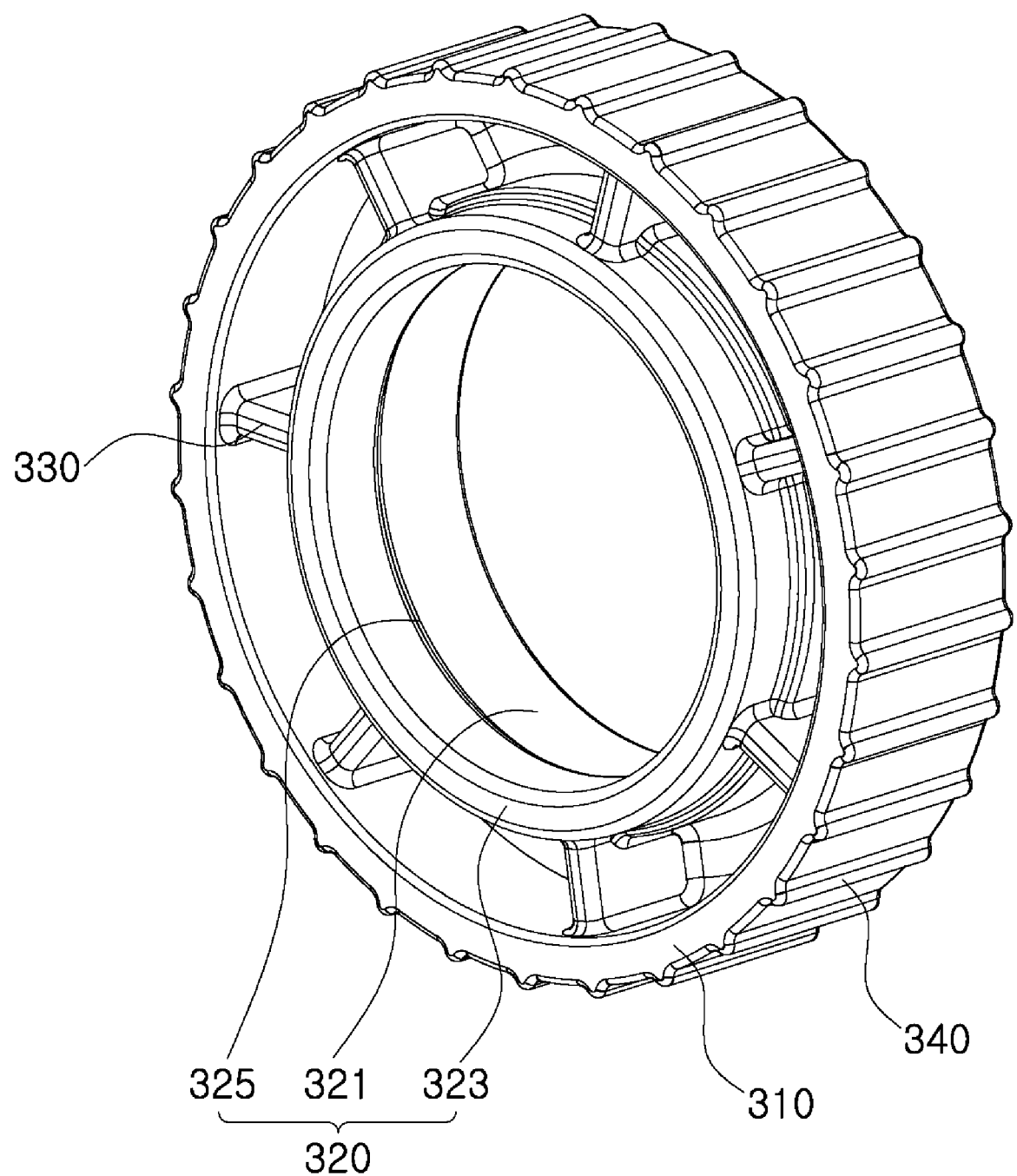
FIG. 7 is a perspective view schematically illustrating the other side of the lower bushing according to the present disclosure.

FIG. 1 is a perspective view schematically illustrating the steering column apparatus according to the embodiment of the present disclosure. FIG. 2 is a schematic cross-sectional view taken along line A-A on FIG. 1. FIG. 3 is a partially enlarged cross-sectional view schematically illustrating the circular portion "B" indicated by a dash-double dotted line on FIG. 2. FIG. 4 is a partially enlarged cross-sectional view schematically illustrating the circular portion "C" indicated by a dash-double dotted line on FIG. 2. FIG. 5 is a perspective view schematically illustrating a lower bushing 300 according to the embodiment of the present disclosure. FIG. 6 is a schematic cross-sectional view taken along line D-D on FIG. 5. FIG. 7 is a perspective view schematically illustrating the other side of the lower bushing 300 according to the present disclosure.

With reference to FIGS. 1 to 7, the steering column apparatus according to the embodiment of the present disclosure may include a housing 100, an input shaft 200, and the lower bushing 300.

The housing 100 is formed to have a hollow shape. The input shaft 200 and the lower bushing 300 may be mounted in an interval space inside the housing 100. The input shaft 200 may be rotatably mounted in the internal space inside the housing 100. The lower bushing 300 may be mounted in the shape of an annular ring on an inner surface of the housing 100.

The input shaft 200 may be rotatably mounted in the housing 100. The input shaft 200 may be connected to a steering wheel (not illustrated). The operation of the steering wheel by a driver may rotate the input shaft 200, thereby adjusting a steering angle of a wheel.

The input shaft 200 may include an input shaft body 210, an input shaft protrusion 220, and an O-ring 230. The input shaft body 210 may be rotatably mounted in the inner space inside the housing 100.

The input shaft protrusion 220 may be mounted on an end portion of the input shaft body 210 (the left-side end portion in FIG. 2) and may come into contact with the lower bushing 300.

The input shaft protrusion 220 may rotatably come into contact with the lower bushing 300 and may press against the lower bushing 300. According to the present disclosure, while being rotated, the input shaft protrusion 220 may press against the lower bushing 300 in a radial direction (the upward-downward direction in FIG. 2).

The O-ring 230 may be formed of elastically deformable material and may be mounted on an outer surface of the input shaft protrusion 220. The O-ring 230 may be formed of elastically deformable material, such as rubber or silicone. The O-ring 230 may be mounted on the outer surface of the input shaft protrusion 220 and may eliminate a gap between the input shaft protrusion 220 and the housing 100.

The lower bushing 300 may be interposed between the housing 100 and the input shaft 200 and, when coming into contact with the housing 100, may be elastically deformed. The lower bushing 300 may be interposed between the housing 100 and the input shaft 200 in place of a ball bearing in the related art and may support a weight in a radial direction of the input shaft 200.

The lower bushing 300 supports the weight in the radial direction of the input shaft 200 and is less expensive than the ball bearing, thereby possibly reducing the unit cost of production. The lower bushing 300 may suppress an excessive motion in the radial direction of the input shaft 200.

The lower bushing 300 may include a lower bushing outer portion 310, a lower bushing inner portion 320, and a connection reinforcement portion 330.

The lower bushing outer portion 310 may be formed in the shape of a ring in such a manner that a horizontal cross section thereof is "¬"-shaped.

The lower bushing inner portion 320 may be positioned inside the lower bushing outer portion 310 and may be connected to the lower bushing outer portion 310. The lower bushing inner portion 320 may be formed in the shape of a ring.

The lower bushing outer portion 310 and the lower bushing inner portion 320 may be formed in the shape of a ring in such a manner that horizontal cross sections thereof, as a whole, are "⊏"-shaped.

The input shaft protrusion 220 of the input shaft 200 may be rotatably mounted on the lower bushing inner portion 320.

The lower bushing inner portion 320 may include a first lower bushing inner portion 321, a second lower bushing inner portion 323, and a lower bushing connection portion 325. The first lower bushing inner portion 321 may surround the input shaft 200. The first lower bushing inner portion 321 may be formed in the shape of a ring, and an inner surface of the first lower bushing inner portion 321 may surround the input shaft 200 in such a manner that the input shaft protrusion 220 of the input shaft 200 is rotatable.

The second lower bushing inner portion 323 may be formed in such a manner as to have a smaller inner diameter than the first lower bushing inner portion 321. The first lower bushing inner portion 321 and the second lower bushing inner portion 323 may be formed in a stepped manner so that the second lower bushing inner portion 323 has a smaller inner diameter than the first lower bushing inner portion 321, and may be design-changed according to a shape of the input shaft protrusion 220 of the input shaft 200.

The lower bushing connection portion 325 may connect the first lower bushing inner portion 321 and the second lower bushing inner portion 323 to each other. The lower bushing connection portion 325 may continuously connect the first lower bushing inner portion 321 and the second lower bushing inner portion 323, which are stepped, to each other without a steep change in size.

The lower bushing connection portion 325 may be formed in such a manner that the first lower bushing inner portion 321 is inclined by a setting angle θ toward the second lower bushing inner portion 323. Since the lower bushing connection portion 325 is formed in a manner that is inclined by the setting angle θ, the first lower bushing inner portion 321 and the second lower bushing inner portion 323 that have different sized may be continuously connected to each other in such a manner that the steep change in size does not occur. The setting angle θ by which the lower bushing connection portion 325 is inclined may be set to 45°.

The lower bushing connection portion 325 may come into contact with the O-ring 230 of the input shaft 200. Since the lower bushing connection portion 325, due to which the first lower bushing inner portion 321 and the second lower bushing inner portion 323 vary in size, comes into contact with the O-ring 230 of the input shaft 200, a gap can be prevented from occurring between the lower bushing 300 and the input shaft 200.

The connection reinforcement portion 330 may connect the lower bushing outer portion 310 and the lower bushing inner portion 320 to each other. An empty space is formed between the lower bushing outer portion 310 and the lower bushing inner portion 320 in a circumferential position where the connection reinforcement portion is not disposed. Therefore, the connection reinforcement portion 330 can reinforce the respective stiffnesses of the lower bushing outer portion 310 and the lower bushing inner portion 320 by connecting the lower bushing outer portion 310 and the lower bushing inner portion 320 to each other.

The forming of the empty space between the lower bushing outer portion 310 and the lower bushing inner portion 320 can reduce the product weight.

A plurality of the connection reinforcement portions 330 may be formed to be spaced equal distances apart from each other along respective circumferential directions of the lower bushing outer portion 310 and the lower bushing inner portion 320. When a plurality of the connection reinforcement portions 330 are formed to be spaced equal distances apart from each other along respective circumferential directions of the lower bushing outer portion 310 and the lower bushing inner portion 320, both the lower bushing outer portion 310 and the lower bushing inner portion 320 can maintain uniform stiffness.

According to the present disclosure, the lower bushing 300 may further include a protrusion 340. The protrusion 340 is formed to protrude toward the housing 100 from an outer surface of the lower bushing outer portion 310. The protrusion 340, when coming into contact with the housing 100, may be elastically deformed.

When coming into contact with the housing 100, the protrusion 340 is elastically deformed by the input shaft 200. As a result, the input shaft 200 can experience reduced shaking, and the occurrence of rattle noise can be reduced.

The protrusion portion 340 may be formed on the outer surface of the lower bushing outer portion 310 in a straight line along a lengthwise direction of the input shaft 200. In addition, a plurality of the protrusions 340 may be formed to protrude along a circumferential direction of the lower bushing outer portion 310 in such a manner as to be spaced equal distances apart from each other.

When a plurality of the protrusions 340 may be formed to protrude along a circumferential direction of the lower bushing outer portion 310 in such a manner as to be spaced equal distances apart from each other, the plurality of the protrusions 340 can come into uniform contact with the housing 100. The protrusion 340 on the lower bushing 300 can facilitate a reduction in dimensional change and a reduction in pressing pressure variation before and after pressing by the input shaft 200.

The lower bushing 300 may be formed of plastic material. In order for the lower bushing 300 to be formed of plastic material, the lower bushing outer portion 310, the lower bushing inner portion 320, the connection reinforcement portion 330, and the protrusion 340 that constitute the lower bushing 300 may be integrally formed using plastic material through injection molding. The lower bushing 300, when formed using plastic material through the injection molding, can be lightweight and be manufactured, as a product, in a simplified manner.

The lower bushing 300 may be formed of engineering plastic material, which is a type of plastic material. The engineering plastic material refers to high-performance plastic material. The engineering plastic material has excellent stiffness and elasticity and can withstand a high-temperature condition.

The engineering plastic material, of which the lower bushing 300 is formed, may contain at least one selected from the group consisting of polycarbonate (PC), modified polyphenylene oxide (mPPO), nylon, polyacetal (acetal or POM), and polybutylene terephthalate (PBT).

In the steering column apparatus according to the present disclosure, the lower bushing 300, which is elastically deformable, is interposed between the housing 100 and the input shaft 200. Thus, the input shaft 200 can be supported in the radial direction.

In addition, according to the present disclosure, the lower bushing 300 interposed between the housing 100 and the input shaft 200 can substitute for the ball bearing in the related art, thereby reducing the unit price of production.

In addition, according to the present disclosure, the use of the lower bushing 300 formed of plastic material can reduce the manufacturing time and the weight of a vehicle.

The specific embodiment of the present disclosure is described above. The technical idea and the scope of the present disclosure are not limited in scope to the specific embodiment. It would be apparent to a person of ordinary skill in the art to which the present disclosure pertains that various modifications and alterations are possibly made to the specific embodiment within the scope that does not depart from the subject matter of the present disclosure that is defined in the claims.

What is claimed is:

1. A steering column apparatus comprising:
   a housing having a hollow shape:
   an input shaft rotatably mounted in the housing; and
   a lower bushing interposed between the housing and the input shaft, the lower bushing being elastically deformable when coming into contact with the housing,
   wherein the lower bushing comprises:
   a lower bushing outer portion;
   a lower bushing inner portion connected to the lower bushing outer portion and arranged inside the lower bushing outer portion; and
   a connection reinforcement portion connecting the lower bushing outer portion and the lower bushing inner portion to each other.

2. The steering column apparatus of claim 1, wherein the lower bushing is formed in a shape of a ring.

3. The steering column apparatus of claim 1, wherein the lower bushing inner portion is formed in a shape of a ring, and
   wherein the lower bushing inner portion comprises:
   a first lower bushing inner portion surrounding the input shaft;
   a second lower bushing inner portion having a smaller diameter than the first lower bushing inner portion; and
   a lower bushing connection portion connecting the first lower bushing inner portion and the second lower bushing inner portion to each other.

4. The steering column apparatus of claim 3, wherein the lower bushing connection portion is inclined from an end of the first lower bushing inner portion by a setting angle toward the second lower bushing inner portion.

5. The steering column apparatus of claim 1, wherein a plurality of the connection reinforcement portions are disposed along respective circumferential directions of the lower bushing outer portion and the lower bushing inner portion.

6. The steering column apparatus of claim 5, wherein the plurality of the connection reinforcement portions are arranged to be spaced equal distances apart from each other along the respective circumferential directions of the lower bushing outer portion and the lower bushing inner portion.

7. The steering column apparatus of claim 5, wherein an empty space is formed between the lower bushing outer portion and the lower bushing inner portion in circumferential positions where the plurality of the connection reinforcement portions are not disposed.

8. The steering column apparatus of claim 1, wherein the lower bushing further comprises:
a protrusion protruding toward the housing from an inner surface of the lower bushing outer portion, the protrusion being elastically deformable when coming into contact with the housing.

9. The steering column apparatus of claim 8, wherein the protrusion is formed in plural and a plurality of the protrusions are spaced equal distances apart from each other along a circumferential direction of the lower bushing outer portion.

10. The steering column apparatus of claim 1, wherein the lower bushing has a plastic material.

11. A steering column apparatus comprising:
a housing having a hollow shape:
an input shaft rotatably mounted in the housing; and
a lower bushing interposed between the housing and the input shaft, the lower bushing being elastically deformable when coming into contact with the housing,
wherein the input shaft comprises:
an input shaft body rotatably mounted in the housing;
an input shaft protrusion mounted on an end portion of the input shaft body and coming into contact with the lower bushing; and
an O-ring having an elastically deformable material, the O-ring being mounted on an outer surface of the input shaft protrusion.

12. The steering column apparatus of claim 11, wherein the lower bushing connection portion comes into contact with the O-ring of the input shaft so as to prevent a gap between the lower bushing and the input shaft.

* * * * *